United States Patent
Vallance et al.

(10) Patent No.: US 8,714,863 B2
(45) Date of Patent: May 6, 2014

(54) FASTENERS

(75) Inventors: William Ernest Taylor Vallance, Marlow (GB); Valter Svara, Izola (SI)

(73) Assignee: Titus + Ltd., Middlesex (GB)

(*) Notice: Subject to any disclaimer, the term of this patent is extended or adjusted under 35 U.S.C. 154(b) by 0 days.

(21) Appl. No.: 12/513,204

(22) PCT Filed: Oct. 26, 2007

(86) PCT No.: PCT/GB2007/004118
§ 371 (c)(1),
(2), (4) Date: Jul. 27, 2009

(87) PCT Pub. No.: WO2008/053186
PCT Pub. Date: May 8, 2008

(65) Prior Publication Data
US 2010/0074677 A1   Mar. 25, 2010

(30) Foreign Application Priority Data

Nov. 1, 2006   (GB) .................................. 0621795.4

(51) Int. Cl.
*F16B 12/00* (2006.01)
(52) U.S. Cl.
USPC .................. 403/245; 403/408.1; 403/DIG. 12
(58) Field of Classification Search
USPC ............ 403/231, 245, 408.1, 409.1, DIG. 10, 403/DIG. 12, DIG. 13; 411/424, 901
See application file for complete search history.

(56) References Cited

U.S. PATENT DOCUMENTS

| 3,884,116 | A | * | 5/1975  | Hage ............................. 428/592 |
| 4,047,822 | A | * | 9/1977  | Lehmann ...................... 403/187 |
| 4,127,353 | A | * | 11/1978 | Busse ............................ 403/245 |
| 4,146,342 | A | * | 3/1979  | Cederholm ................... 403/247 |
| 4,353,663 | A | * | 10/1982 | Glickman ..................... 403/230 |
| 4,802,807 | A | * | 2/1989  | Offenburger et al. ....... 411/387.1 |
| 4,826,345 | A | * | 5/1989  | Salice ........................... 403/231 |
| 4,962,806 | A | * | 10/1990 | Nottelmann et al. ......... 164/112 |
| 5,284,401 | A | * | 2/1994  | Harley ....................... 403/409.1 |
| 5,359,944 | A | * | 11/1994 | Steinbeck ..................... 403/294 |
| 5,375,923 | A | * | 12/1994 | Hall et al. .................. 312/348.4 |
| 5,567,081 | A | * | 10/1996 | Vallance ....................... 403/292 |
| 5,788,440 | A |   | 8/1998  | Andronica |
| 5,810,505 | A | * | 9/1998  | Henriott et al. .............. 403/230 |
| 5,906,453 | A | * | 5/1999  | Grieser et al. ............. 403/409.1 |

(Continued)

FOREIGN PATENT DOCUMENTS

| DE | 2457058 A1 | 6/1976 |
| DE | 29620985 U1 | 2/1997 |

(Continued)

*Primary Examiner* — Joshua Kennedy
(74) *Attorney, Agent, or Firm* — Alan Kamrath; Kamrath IP Lawfirm, P.A.

(57) ABSTRACT

A fastener for a furniture jointing device is made in two parts. The first part (10), including head (12) and shank (11) portions, is made from a first material such as steel. The second part (13) is made from a second material such as zinc and is conveniently cast directly onto the first part (10). The second part (13) is made with thread formations to enable it to be anchored to a first furniture component (15). The head portion (12) of the first part (10) is designed to engage with a camming element (16) mounted in a second furniture component (18).

15 Claims, 2 Drawing Sheets

(56) References Cited

U.S. PATENT DOCUMENTS

| | | |
|---|---|---|
| 6,257,796 B1 * | 7/2001 | Salice .................. 403/231 |
| 6,276,868 B1 * | 8/2001 | Vallance .............. 403/409.1 |
| 6,588,994 B2 * | 7/2003 | Wienhold ............. 408/226 |
| 7,083,370 B2 * | 8/2006 | Vallance ............... 411/45 |
| 7,104,742 B1 * | 9/2006 | Fitts, III ............... 411/537 |
| 7,341,395 B2 * | 3/2008 | Tseng ................... 403/296 |
| 2002/0009342 A1 * | 1/2002 | Vasudeva ............. 408/226 |
| 2005/0002750 A1 | 1/2005 | Vallance |
| 2005/0042027 A1 * | 2/2005 | Migli ................... 403/409.1 |
| 2005/0181230 A1 * | 8/2005 | Straus .................. 428/658 |

FOREIGN PATENT DOCUMENTS

| | | |
|---|---|---|
| GB | 682453 | 11/1952 |
| GB | 964917 | 7/1964 |
| GB | 1009985 | 11/1965 |
| GB | 1174319 | 12/1969 |
| GB | 2277973 A1 | 11/1994 |
| WO | WO 2004027270 A3 | 4/2004 |

* cited by examiner

FASTENERS

This invention relates to fasteners and in particular, though not exclusively, to fasteners for use in the furniture industry.

According to the invention, there is provided a fastening element for use with a tightening element to form a device for joining together two members. The fastening element has a fixing portion at one end thereof for attaching the fastening element to a first one of the members, and a head portion at the other end thereof for engaging said tightening element mounted in use in or on the second of the members, with a shank portion extending between the fixing portion and the head portion. The fastening element is made in two parts, with the head and shank portions forming a first part and the fixing portion forming a second part.

Making a fastening element in this way has the advantage of enabling it to be designed with the necessary strength to resist failure and the necessary dimensional accuracy to ensure correct operation.

Figure 1:
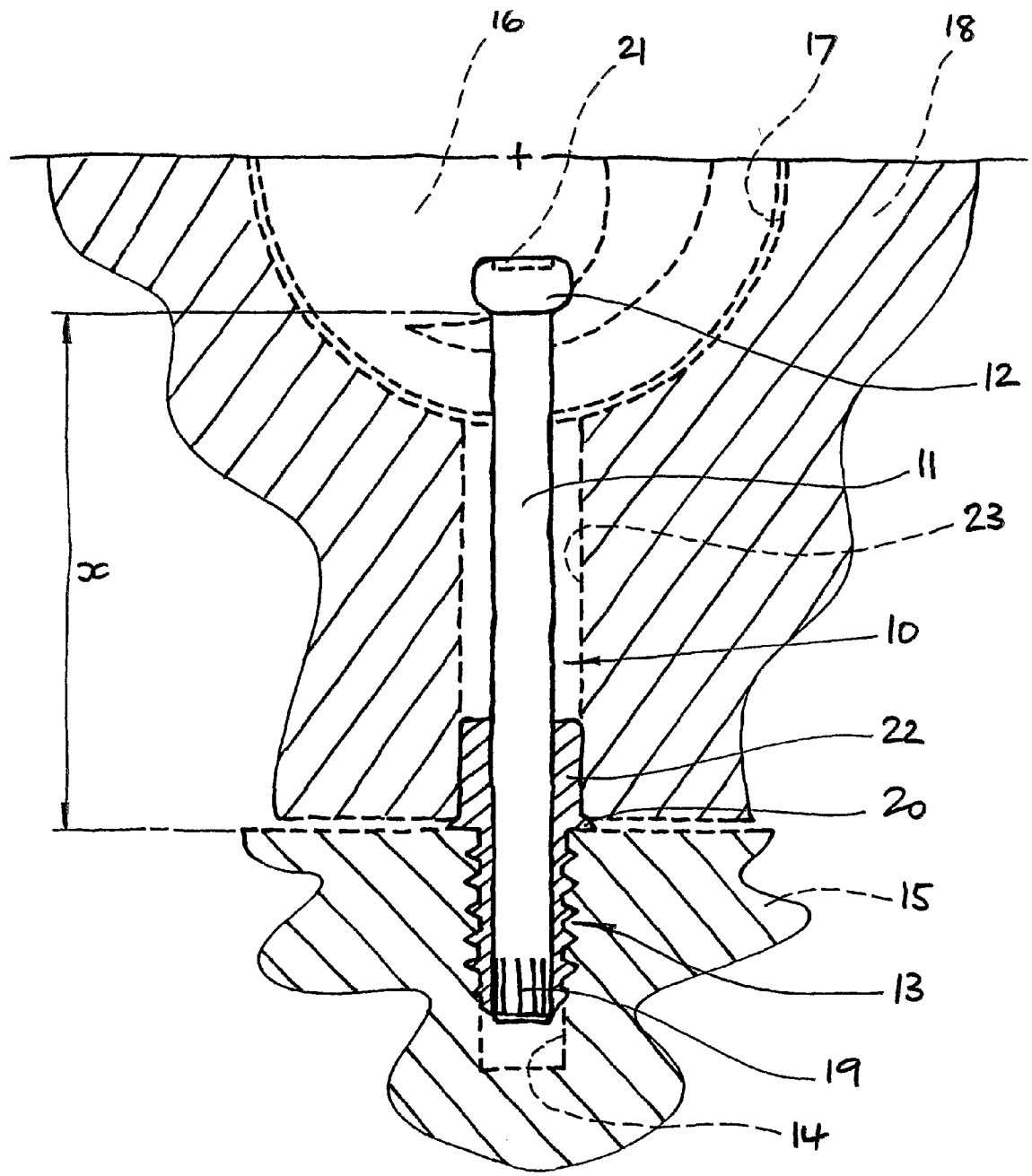
Figure 2:
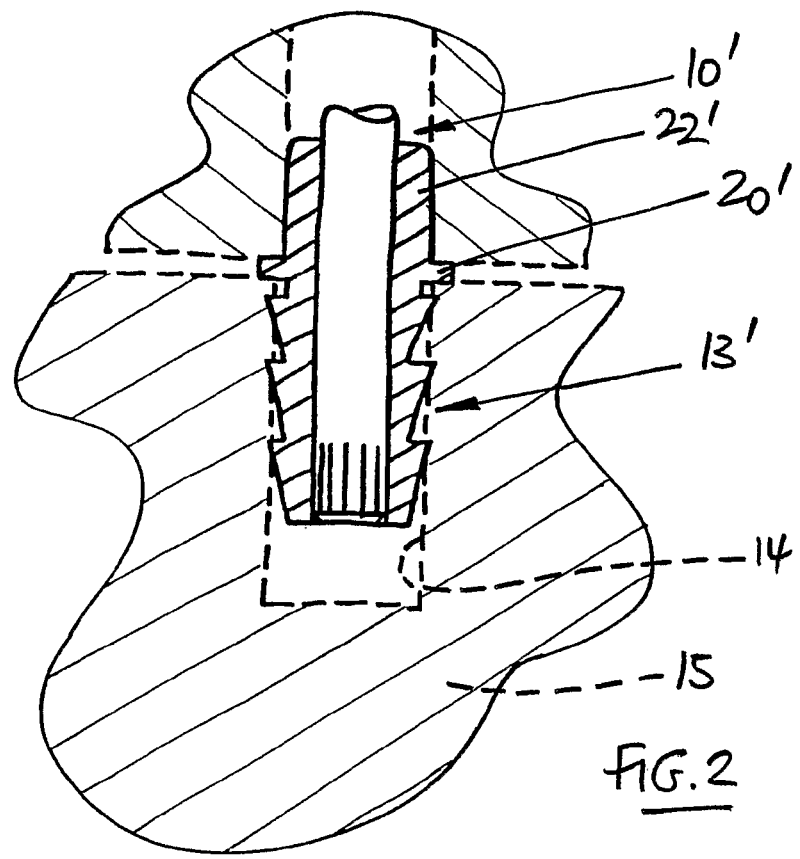
Figure 3:
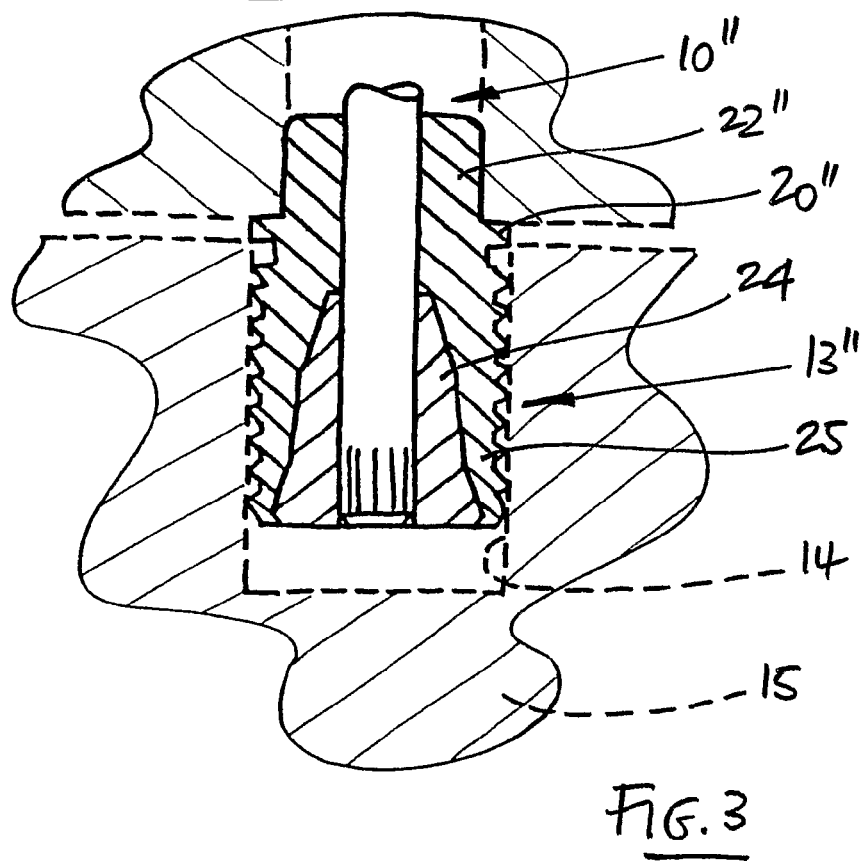

By way of example, embodiments of the invention will now be described with reference to the accompanying drawings, in which:

FIG. 1 shows a sectional view of one embodiment of fastening element according to the invention, and FIGS. 2 and 3 show other embodiments of fastening elements according to the invention.

The fastening element 10 seen in FIG. 1 has an elongate shank 11 with an enlarged head 12 at one end. At its other end, the fastening element 10 has a fixing portion 13. The fixing portion 13 is for anchoring the fastening element 10 in a hole 14 in a panel 15 (shown in the drawings in dashed lines).

The head 12 of the fastening element 10 is designed to be engaged in use by a tightening element, such as a cam drum 16 (shown in FIG. 1 in dashed lines), which is rotatably mounted in a hole 17 in another panel 18 (again, shown in dashed lines in FIG. 1). The fastening and tightening elements are designed to interact in the known manner of a cam and dowel type of fastener, ie where rotation of the cam pulls the dowel and draws the panels together in a tight joint. An example of such a prior art device can be seen in UK patent No 2305226.

The fastening element is also suitable for interacting with another known form of tightening element, namely one with a ramped surface. In this arrangement, one panel is moved laterally with respect to the other, and the ramped surface acts like a wedge on the dowel head to cause the panels to be drawn together.

As will be seen in FIG. 1, the fastening element 10 is made in two parts. The head 12 and shank 11 form one part and are made of steel, conveniently from steel bar, with the head being formed by a pressing or rolling process. The fixing portion 13 forms the other part and is made of zinc, conveniently being formed directly onto the shank 11 by a casting process known as insert moulding. The shank 11 is provided with longitudinal grooves 19 to strengthen the connection between the two parts and to prevent any relative movement between them. Other manners of providing a key between the two parts may be used instead, such as radial grooves or knurling.

The fixing portion 13 comprises an external helical screwthread. This enables the fastening element 10 to be screwed into the hole 14 in the panel 15. The head 12 of the fastening element 10 is provided with a slot or slots 21 on its upper surface for engagement by a tool such as a screwdriver to effect this process.

The fixing portion 13 has a flange 20 at the inner end of the screwthread formations. This flange 20 is designed to act as a depth stop to limit insertion of the fastening element 10 into the hole 14 in the panel 15. An extension 22 of the fixing portion 13 beyond the flange 20 serves to locate the fastening element 10 within its mounting hole 23 in the panel 18 in which the cam drum 16 is mounted.

The flange 20 also has another important role, in that it governs the distance x by which the underside of the head 12 of the fastening element 10 is spaced from the edge of the panel 15. It is desirable to ensure the accuracy of dimension x to within a relatively small degree of tolerance, as this ensures that the fastening element 10 will be able to engage correctly with the tightening element 16 in use. Forming the flange 20 by a moulding process is an effective way of achieving this. Also, using the moulding process is a more cost-effective way of providing a well formed screwthread formation.

It is advantageous to make the head 12 and shank 11 of the fastening element 10 out of steel, because this is a relatively strong material. The element will thus have a greater resistance to failure through its head breaking off than would an all-moulded part.

FIG. 2 illustrates another form of fastening element 10'. This is essentially like the FIG. 1 fastening element 10, but with a different form of fixing portion 13'. Particularly, the fixing portion 13' comprises a series of barbed projections. The fastening element 10' is designed to be pushed into its mounting hole 14 in the panel 15, where the barbed projections then bite into the material to prevent its withdrawal. The fixing portion 13' incorporates an abutment flange 20' and an extension piece 22', which are analogous to the equivalent features of the FIG. 1 embodiment described above.

The FIG. 3 embodiment is again akin to the FIGS. 1 and 2 embodiments, except that the fastening element 10" has a different form of fixing portion 13". Particularly, the fixing portion 13" is in the form of a multi-tapered profile 24, which is designed to interact with an expandable sleeve 25. The sleeve 25 expands upon relative axial movement of the tapered profile 24 to anchor the fastening element 10" in its mounting hole 14 in the panel 15 in a manner known in the art, for example from UK patent No 2285106. The sleeve 25 has an abutment flange 20" and an extension piece 22", which are analogous to the equivalent features of the FIG. 1 embodiment described above.

The invention claimed is:

1. A fastening element for use with a tightening element to form a device for joining together first and second members, the fastening element consisting of:
   a first part consisting of steel and a second part consisting of zinc formed into a one-piece element by means for connecting the first and second, separate parts to prevent any relative movement there between,
   the first part comprising head and shank portions; and
   the second part comprising a fixing portion and a flange;
   the fixing portion being located at one end of the fastening element for attaching the fastening element to the first member, the head portion being located at the other end thereof for engaging said tightening element in use mounted in the second member, and the shank portion extending between the fixing portion and the head portion;
   the fastening element having an axis extending between the one end and the other end, with the flange being intermediate the head and the fixing portion and including an annular surface extending perpendicular to the axis having a diametric extent greater than a diametric extent of the fixing portion and limiting depth of penetration of the fixing portion into said first member.

2. A fastening element as claimed in claim 1 wherein said second part is made of the zinc directly formed on said first part by an insert moulding process.

3. A fastening element as claimed in claim 1 further comprising an extension portion to extend in use into a mounting hole for the fastening element in said second member for locating the fastening element therein, with the flange located intermediate the extension portion and the fixing portion, with the fixing portion, the flange, and the extension portion forming the second part, with the diametric extent of the flange being greater than a diametric extent of the extension portion.

4. A fastening element as claimed in claim 3 wherein said fixing portion comprises formations in the form of an external screwthread concentric to the axis for anchoring the fastening element by a screwed connection.

5. A fastening element as claimed in claim 3 wherein said fixing portion comprises formations in the form of barbed projections for anchoring the fastening element by a push fit connection in an axial direction.

6. A joint as claimed in claim 1 wherein the first part is made of the steel formed by a pressing or rolling process; and wherein the second part is made of the zinc directly formed onto the first part by a casting process.

7. A fastening element as claimed in claim 1 wherein the connecting means comprises the second part cast upon the first part.

8. A fastening element as claimed in claim 1 wherein the connecting means comprises the second part directly formed on the first part.

9. A joint comprising first and second members, a fastening element as claimed in claim 1 mounted in the first member and a tightening element mounted in the second member.

10. A joint as claimed in claim 9 wherein said tightening element is in the form of a rotatably mounted camming element.

11. A joint as claimed in claim 9 wherein the second member includes a mounting hole, wherein the fastening element further includes an extension portion extending into the mounting hole in said second member for locating the fastening element therein, with the fixing portion, the flange, and the extension portion forming the second part, with the diametric extent of the flange being greater than a diametric extent of the mounting hole.

12. A joint as claimed in claim 11 wherein said fixing portion comprises formations in the form of an external screwthread concentric to the axis for anchoring the fastening element by a screwed connection.

13. A joint as claimed in claim 11 wherein said fixing portion comprises formations in the form of barbed projections for anchoring the fastening element by a push fit connection in an axial direction.

14. A device as claimed in claim 11 with the flange located intermediate the extension portion and the first member and with the flange located intermediate the fixing portion and the mounting hole.

15. A piece of furniture comprising a fastening element as claimed in claim 1.

* * * * *